United States Patent Office 3,277,112
Patented Oct. 4, 1966

3,277,112
PHENOXY 2-(1,3-DIAZA-2-CYCLOALKENYL)
COMPOUNDS
William Laszlo Bencze, New Providence, N.J., assignor to Ciba Corporation, New York, N.Y., a corporation of Delaware
No Drawing. Filed Sept. 20, 1963, Ser. No. 310,451
5 Claims. (Cl. 260—309.6)

The present invention concerns benzocycloalkadiene compounds. More particularly, it relates to benzocycloalkadiene compounds, in which the cycloalkadiene portion has from five to six ring members and its two carbon-to-carbon double bonds are conjugated, and in which both carbon atoms of the non-benzenoid carbon-to-carbon double bond are substituted by monocyclic carbocyclic aryl, at least one of which has an R-methoxy substituent, in which R is a 2-(1,3-diaza-2-cycloalkenyl), or salts of such compounds, as well as process for the preparation of such compounds.

More particularly, it relates to compounds having the following formula

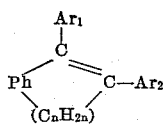

in which Ph is a 1,2-phenylene radical, each of the two groups $Ar_1$ and $Ar_2$ is a monocyclic carbocyclic aryl radical, at least one of which is substituted by an R-methoxy group, in which R has the previously given meaning, and the group of the formula $—(C_nH_{2n})—$ is lower alkylene separating by one to two carbon atoms the 1,2-phenylene radical from the carbon atom substituted by the group $Ar_2$, or salts of such compounds.

The benzo portion of the benzocycloalkadiene ring system, especially the 1,2-phenylene radical Ph, is unsubstituted or may be substituted by one or more than one of the same or of different groups which may substitute any of the positions available for substitution. Such substituents are, for example, aliphatic substituents, such as lower alkyl, e.g. methyl, ethyl, n-propyl, isopropyl, n-butyl, isobutyl, secondary butyl, teriary butyl and the like, etherified hydroxyl, particularly lower alkoxy, e.g. methoxy, ethoxy, n-propyloxy, isopropyloxy and the like, or any other etherified hydroxyl group, esterified hydroxyl, such as halogeno (representing hydroxyl esterified by a hydrohalic acid), e.g. fluoro, chloro, bromo and the like, halogeno-lower alkyl, especially trifluoromethyl, as well as 1,1,2,2,2-pentafluoroethyl and the like, or any other suitable substituent.

A substituted 1,2-phenylene group Ph in the above formula is particularly (lower alkyl)-1,2-phenylene, (etherified hydroxy)-1,2-phenylene, especially (lower alkoxy)-1,2-phenylene, or (esterified hydroxy)-1,2-phenylene, especially (halogeno) - 1,2 - phenylene, (halogeno-lower alkyl) - 1,2 - phenylene, especially (trifluoromethyl)-1,2-phenylene, or any other substituted 1,2-phenylene radical.

The cycloalkadiene portion of the benzoazacycloalkadiene ring system has from five to six ring members. In the above formula, the group of the formula

is lower alkylene having preferably from one to four carbon atoms (the letter n stands preferably for an integer from 1 to 4), and separates the 1,2-phenylene group Ph from the carbon atom carrying the group $Ar_2$ by at most two carbon atoms. Such lower alkylene radical, representing the group of the formula $—(C_nH_{2n})—$, is above all methylene or 1,2-ethylene, but may also be 1,1-ethylene, 2,2-propylene, 1,1-butylene, 1-methyl-1,2-ethylene, 2-methyl-1,2-ethylene, 2,2-propylene, 2,3-butylene, 1,1-isobutylene and the like.

As indicated above, at least one of the monocyclic carbocyclic aryl groups $Ar_1$ and $Ar_2$ has an R-methoxy substituent, in which R is a 2-(1,3-diaza-2-cycloalkenyl) radical of five to seven ring members. Such group is more particularly a 2-imidazolinyl radical, but may also be a 2-(1,4,5,6-tetrahydro-pyrimidyl) or a 2-(1,3-diaza-2-cycloheptenyl) radical. The carbon atoms of the 2-(1,3-aza-2-cycloalkenyl) radical available for substitution, as well as one of its aza-nitrogen ring members, may be substituted, for example, by lower alkyl, e.g. methyl, ethyl, n-propyl, isopropyl, n-butyl, tertiary butyl and the like.

The 2-(1,3-diaza-2-cycloalkenyl) radical may be represented by the partial formula

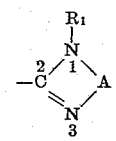

in which $R_1$ is hydrogen or lower alkyl, and A is lower alkylene separating the two nitrogen atoms by two to four carbon atoms. The latter may be represented above all by 1,2-ethylene, but may also be 1-methyl-1,2-ethylene, 1,1-dimethyl-1,2-ethylene, 1,2-dimethyl-1,2-ethylene, 1,3-propylene, 1-methyl-1,3-propylene, 2,2-dimethyl-1,3-propylene, 1,3-dimethyl-1,3-propylene, 1-ethyl-1,3-propylene, 1,4-butylene, 1-methyl-1,4-butylene and the like.

The two monocyclic carbocyclic aryl groups $Ar_1$ and $Ar_2$, at least one of which contains the R-methoxy substituent, may be otherwise unsubstituted or may contain additional substituents, e.g. lower alkyl, lower alkoxy, halogeno, halogeno-lower alkyl and the like, such as the substituents attached to the benzo portion of the benzocycloalkadiene ring system.

Salts of the compounds of this invention are acid addition salts, such as the pharmaceutically acceptable, non-toxic acid addition salts with inorganic acids, e.g. hydrochloric, hydrobromic, sulfuric, phosphoric acids and the like, or with organic acids, such as organic carboxylic acids, e.g. formic, acetic, propionic, glycolic, malonic, succinic, maleic, hydroxy-maleic, fumaric, malic, tartaric, citric, benzoic, cinnamic, salicylic, 4-aminosalicylic, 2-phenoxybenzoic, 2-acetoxybenzoic acid and the like, or organic sulfonic acids, e.g. methane sulfonic, ethane sulfonic, 2-hydroxyethane sulfonic, ethane 1,2-disulfonic, benzene sulfonic, p-toluene sulfonic, naphthalene 2-sulfonic acid and the like. Other acid addition salts may be used as intermediates, for example, in the purification of the free compounds or in the preparation of other, for example, pharmaceutically acceptable acid addition salts, as well as for identification and characterization purposes. Acid addition salts, which are primarily used for the latter are, for example, those with acidic organic nitro compounds, e.g. picric, picrolonic, flavianic acid and the like, or with metal complex acids, e.g. phosphotungstic, phosphomolybdic, chloroplatinic, Reinecke acid and the like.

The new compounds of this invention have antifibrillatory properties and are, therefore, useful in the treatment of neurogenic or cardiogenic, auricular or ventricular fibrillation. The antifibrillatory properties exhibited by the compounds of this invention are of prolonged duration.

Outstanding pharmacological properties are exhibited by the compounds having the following formula

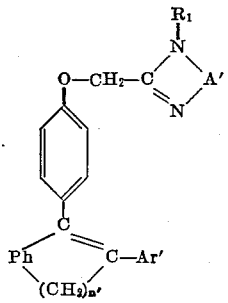

in which the group Ph' is 1,2-phenylene, (lower alkyl)-1,2-phenylene, (lower alkoxy)-1,2-phenylene, (halogeno)-1,2-phenylene or (trifluoromethyl)-1,2-phenylene, the letter $n'$ is one of the integers 1 and 2, A' stands for alkylene having from two to three carbon atoms and separating the two nitrogen atoms by from two to three carbon atoms, $R_1$ is primarily hydrogen, as well as lower alkyl, the group $Ar_2'$ is phenyl, (lower alkyl)-phenyl, (lower alkoxy)-phenyl, (halogeno)-phenyl, (trifluoromethyl)-phenyl or the group of the formula

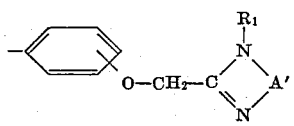

in which A' and $R_1$ have the previously-given meaning, or acid addition salts, particularly pharmaceutically acceptable, non-toxic acid addition salts, thereof.

The compounds of this invention are useful in the form of compositions for enteral, e.g. oral, or parenteral use, which consist essentially of a pharmacologically effective amount of one of the new compounds of this invention in admixture with a pharmaceutically acceptable, organic or inorganic, solid or liquid carrier. For making up the compositions, there are employed substances which do not react with the new compounds, such as water, gelatin, lactose, starches, stearic acid, magnesium stearate, calcium stearate, talc, vegetable oils, benzyl alcohol, stearyl alcohol, gums, accacia, tragacanth, propylene glycol, polyalkylene glycols, or any other carrier materials suitable for making up such compositions. The latter may be in solid form, for example, as capsules, tablets, dragees and the like, or in liquid form, for example, as solutions, suspensions, emulsions and the like. If desired, they may contain auxiliary substances, such as preserving, stabilizing, wetting, emulsifying, coloring, flavoring agents and the like, salts for varying the osmotic pressure, buffers, etc. They may also contain, in combination, other useful substances.

The compounds of the present invention are prepared according to known methods. For example, a benzocycloalkadiene compound, in which the cycloalkadiene portion has from five to six ring members and its two carbon-to-carbon double bonds are conjugated, and in which both carbon atoms of the non-benzenoid carbon-to-carbon double bond are substituted by monocyclic carbocyclic aryl, at least one of which has a hydroxyl substituent, or a salt thereof, may be treated with a reactive esterified R-methanol, in which R is a 2-(1,3-diaza-2-cycloalkenyl) radical, or a salt thereof, and, if desired, a resulting salt may be converted into the free compound or into another salt, and/or, if desired, a hydrogen atom attached to one of the aza-nitrogen atoms of the 2-(1,3-diaza-2-cycloalkenyl) radical in a resulting compound may be replaced by lower alkyl, and/or, if desired, a free compound may be converted into a salt thereof.

Salts of the benzocycloalkadiene starting materials are metal salts, particularly the alkali metal, e.g. sodium, potassium and the like, salts, as well as the alkaline earth metal salts thereof, or any other suitable salts. These salts are prepared according to known methods, for example, by reacting the free starting material with a metal, particularly an alkali metal, or, more especially, with an alkali metal hydride, amide or lower alkoxide, e.g. methoxide, ethoxide, tertiary butoxide and the like, in the presence of an appropriate diluent.

A reactive esterified R-methanol used as the reagent in the above reaction is above all the ester of such alcohol with a strong inorganic acid, particularly a hydrohalic acid, e.g. hydrochloric acid, hydrobromic acid or hydriodic acid; other suitable esters are those with sulfuric acid, as well as with strong organic acids, particularly strong organic sulfonic acids, such as lower alkane sulfonic acids or monocyclic carbocyclic aryl sulfonic acids, i.e. methane sulfonic, ethane sulfonic, 2-hydroxy-ethane sulfonic, p-toluene sulfonic acid and the like. Salts of a reactive ester of an R-methanol are addition salts with acids, such as those mentioned before, particularly the hydrohalic acids.

The reaction is carried out in the absence or in the presence of a diluent; the selection of the latter depends on the properties of the reagents. Thus, suitable solvents are, for example, lower alkanols, e.g. methanol, ethanol and the like, ethers, e.g. diethyl ether, p-dioxane, tetrahydrofuran and the like, hydrocarbons, e.g. hexane, cyclohexane, benzene, toluene and the like, N,N-disubstituted amides, e.g. N,N-dimethylformamide and the like, or any solvent or solvent mixture. The formation of the salt may also be carried out in situ; thus, the starting material may be mixed with the reactive esterified R-methanol or a salt thereof, and the salt-forming reagent may then be added to the mixture. If necessary, the reaction may be carried out while cooling or at an elevated temperature, in a closed vessel and/or in the atmosphere of an inert gas, e.g. nitrogen.

The starting materials used in the above procedure are prepared according to known methods; for example, they may be obtained by reacting a benzocycloalkene compound, in which the cycloalkene portion has from five to six ring members, and one of its carbon atoms has an oxo group, whereas a neighboring carbon atom, with which the carbon atom having an oxo group forms the conjugated carbon-to-carbon double bond in the desired benzocycloalkadiene starting material, is substituted by a monocyclic carbocyclic aryl group, with a monocyclic carbocyclic aryl magnesium halide, e.g. chloride, bromide and the like, which is substituted by a functionally converted hydroxyl group, primarily an etherified hydroxyl group, such as lower alkoxy, e.g. methoxy, ethoxy and the like, 1-phenyl-lower alkoxy, e.g. benzyloxy and the like, or any other functionally converted hydroxyl group suitable for conversion into a free phenolic hydroxyl group. The above reaction is carried out according to the Grignard reaction; if necessary, the "Method of Entrainment" described by Kharash and Reinmuth, Grignard Reactions of Nonmetallic Substances (Prentice-Hall, 1954), or the apparative modification described by Lawesson, Acta Chem. Scand., vol. 12, p. 1 (1958), may be employed.

A resulting benzocycloalkene compound, in which the cycloalkene portion has from five to six ring members, and one of its carbon atoms has a monocyclic carbocyclic aryl group substituted with a functionally converted hydroxyl group, and hydroxyl as substituents, whereas a neighboring carbon atom, with which the carbon atom having the two substituents forms the conjugated carbon-to-carbon double bond in the desired benzocycloalkadiene starting material, is substituted by a monocyclic carbocyclic aryl group, may lose the elements of water under the conditions of the reaction, or may be dehydrated subsequently (for example, by treatment with an acidic reagent, e.g. hydrochloric acid, ammonium chloride and the like) to yield a benzocycloalkadiene compound, in which the cycloalkadiene portion has from five to six ring members, and its carbon-to-carbon double bonds are conjugated, and in which both carbon atoms of the non-benzenoid carbon-to-carbon double bond are substituted by monocyclic carbocyclic aryl, at least one of which has a functionally converted hydroxyl group. In such intermediate, a functionally converted hydroxyl group, such as an etherified hydroxyl group, is converted into the desired free hydroxyl group according to known methods; for example, a lower alkoxy group may be hydrolized into a hydroxyl group by treatment with a suitable acid reagent, such as a mineral acid, e.g. hydrobromic, hydriodic acid and the like (if desired, in the presence of an organic acid, e.g. glacial acetic acid and the like, a mineral acid addition salt of a weak organic base, e.g. pyridine hydrochloride and the like, or any other suitable reagent, such as, for example, aluminum chloride and the like), whereas a 1-phenyl-lower alkoxy group, especially benzyloxy, is converted into free hydroxyl by hydrogenolysis (for example, by treatment with hydrogen in the presence of a catalyst, e.g. a palladium catalyst and the like, preferably in the presence of a diluent and, if necessary, under pressure).

The compounds of this invention may also be prepared, for example, by converting in a benzocycloalkadiene compound, in which the cycloalkadiene portion has from five to six ring members and its two carbon-to-carbon double bonds are conjugated, and in which both carbon atoms of the non-benzenoid carbon-to-carbon double bond are substituted by monocyclic carbocyclic aryl, at least one of which has a functionally converted carboxy-methoxy substituent, the reactive functionally converted carboxyl group into the group R is a 2-(1,3-diaza-2-cycloalkenyl) radical having from five to seven ring members, and, if desired, carrying out the optional steps.

The reactive functionally converted carboxyl group in the above starting material is primarily a cyano group, as well as an amido-ether, an imido-thioether, an imido-halide, an amidino, an amido, a thioamido, an ester, or an acid halide grouping. These groups are represented by those of the formulae

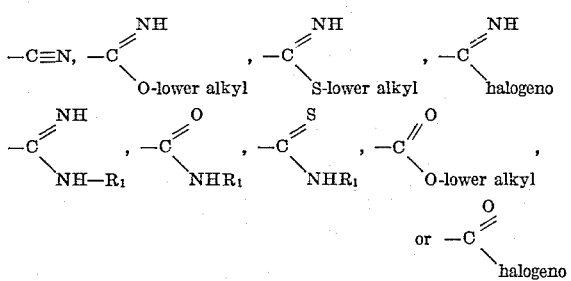

in which halogeno stands primarily for chloro, as well as bromo and the like, and $R_1$ has the above-given meaning, i.e. stands for hydrogen or lower alkyl.

The conversion of the reactive functionally converted carboxyl group into the desired 2-(1,3-diaza-2-cycloalkenyl) radical is carried out according to known methods. For example, the starting material is reacted with a lower alkylene diamine, in which the two amino groups are separated by two to four carbon atoms, or with a compound capable of being converted into such lower alkylene diamine by treatment with ammonia, or with a reactive N-substituted derivative of such lower alkylene diamine. The desired ring formation is carried out directly or in stages, if necessary, in the presence of a suitable reagent; furthermore, the process may be performed in such manner that a functional acid derivative is formed in the course of the reaction.

For example, whenever a benzocycloalkadiene starting material, in which the cycloalkadiene portion has from five to six ring members and its two carbon-to-carbon double bonds are conjugated, and in which both carbon atoms of the non-benzenoid carbon-to-carbon double bond are substituted by monocyclic carbocyclic aryl, at least one of which has a cyano-methoxy substituent, which compound represents the preferred starting material, is used and reacted directly with the lower alkylene diamine or with a derivative thereof, it is of advantage to perform the reaction in the presence of hydrogen sulfide, carbon disulfide and the like; in such reaction, the lower alkylene diamine may be used in the form of a salt thereof.

Compounds capable of being converted into a lower alkylene diamine by the reaction with ammonia, are, for example, the corresponding hydroxy-lower alkyl-amines, or especially the esters thereof, as well as lower alkylene halides. Using these starting materials, the reaction is carried out in the presence of ammonia or an agent yielding ammonia.

Reactive N-substituted derivatives of the lower alkylene diamines used as reagents in the above process are ureas, such as, for example, ethylene urea, propylene urea and the like.

To carry out the procedure in stages, the starting material is reacted with the lower alkylene diamine to form the N-acyl compound, which is then ring-closed by elimination of water, for example, by using a dehydrating agent, such as calcium oxide and the like, or by desulfurization, for example, with a heavy metal oxide and the like.

The above reaction is carried out according to known methods; conditions depend largely on the choice of the starting material and the reagent. Thus, the reaction may be carried out in the absence or presence of a diluent, catalyst and/or condensing agent, if necessary, while cooling or at an elevated temperature, under increased pressure, and/or in the atmosphere of an inert gas, such as nitrogen. By-products, formed during the reaction, such as water, may be removed, for example, by azeotropic distillation. Furthermore, one of the reactants may be used in excess of the other.

The starting materials used in the above procedure are prepared according to known methods. For example, the salt of a benzocycloalkadiene compound, in which the cycloalkadiene portion has from five to six ring members and its two carbon-to-carbon double bonds are conjugated, and in which both carbon atoms of the non-benzenoid carbon-to-carbon double bond are substituted by monocyclic carbocyclic aryl, at least one of which has a hydroxyl group as a substituent, may be treated with a reactive esterified hydroxy-acetic acid or a reactive functionally converted acid derivative thereof; this reaction is carried out in a manner analogous to the one previously described, involving treatment of a benzocycloalkadiene starting material or a salt thereof with a reactive ester of an R-methanol or a salt thereof. In any resulting compound a free carboxyl group or a reactive functionally converted carboxyl group may be converted into the desired reactive functionally converted carboxyl group according to methods known per se.

In a resulting compound, in which one of the nitrogen atoms of the 2-(1,3-diaza-2-cycloalkenyl) radical carries a hydrogen, such hydrogen may be replaced by lower alkyl according to known methods. For example, a resulting benzocycloalkadiene compound, in which the cycloalkadiene portion has from five to six ring members and its two carbon-to-carbon double bonds are conjugated, and in which both carbon atoms of the non-benzenoid carbon-to-carbon double bond are substituted by monocyclic carbocyclic aryl, at least one of which has an R-methoxy substituent, in which R is an N-unsubstituted 2-(1,3-diaza-2-cycloalkenyl) radical, or a salt thereof, such as, an alkali metal salt thereof, may be reacted with a reactive ester of a lower alkanol, for example, a lower alkyl halide, e.g. methyl, ethyl or isopropyl, chloride, bromide, or iodide and the like, or a di-lower alkyl sulfate, e.g. dimethyl sulfate, diethyl sulfate and the like, to yield the corresponding benzocycloalkadiene compound having at least one monocyclic carbocyclic aryl group with an N-lower alkylated 2-(1,3-diaza-2-cycloalkenyl) radical.

A resulting salt may be converted into the free compound, for example, by treatment with an alkaline reagent, such as a metal hydroxide, e.g. sodium hydroxide, potassium hydroxide, calcium hydroxide and the like, a metal carbonate, e.g. sodium, potassium or calcium carbonate or hydrogen carbonate and the like, ammonia or any other alkaline reagent, as well as a suitable hydroxyl ion exchange preparation, etc.

A resulting salt may be converted directly into another salt; for example, a salt, especially an inorganic acid addition salt, may be reacted with a suitable metal, e.g. sodium, barium, silver and the like, salt of an acid, in a diluent, in which a resulting inorganic salt is insoluble and is thus removed from the reaction. Conversion of one acid addition salt into another may also be achieved by treatment with an anion exchange preparation.

A free compound may be converted into an acid addition salt by reacting it or a solution thereof in a suitable solvent or solvent mixture with an acid, such as one of those described before, or a solution thereof, or with a suitable anion exchange preparation, and isolating the desired salt. A salt may be obtained in the form of a hydrate or may contain solvent of crystallization.

The invention also comprises any modification of the process wherein a compound formed as an intermediate at any stage of the process, is used as starting material and the remaining step(s) of the process is (are) carried out, or the process is discontinued at any stage, or in which the starting materials are formed in the course of the reaction. Also included within the scope of the present invention are any new intermediates, such as, for example, those mentioned hereinbefore.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

Example 1

To a solution of 2.5 g. of 4-(4-hydroxy-phenyl)-3-phenyl-1,2-dihydro-naphthalene in 25 ml. of N,N-dimethylformamide and 25 ml. of toluene is added 1.5 g. of 2-chloromethyl-2-imidazoline hydrochloride. The resulting suspension is stirred and cooled in an ice-bath while adding 0.95 g. of a 53 percent mixture of sodium hydride in mineral oil in portions. The reaction mixture is then stirred at room temperature for twenty-four hours and is then diluted with 5 ml. of ethanol, 20 ml. of benzene and 20 ml. of diethyl ether. The precipitated sodium chloride is filtered off, the filtrate is concentrated under reduced pressure to about 10 ml. and is then diluted with water. The resulting mixture is extracted three times with ethyl acetate; the combined extracts are washed with a saturated aqueous solution of sodium chloride, dried over sodium sulfate, filtered and evaporated to dryness. The resulting crystalline 4-[4-(2-imidazolin - 2 - yl-methoxy) - phenyl]-3-phenyl-1,2-dihydro-naphthalene of the formula

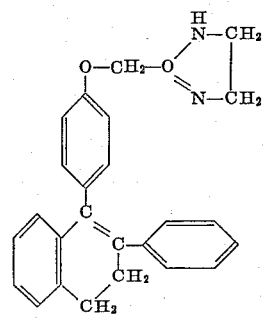

is purified by recrystallization from a mixture of benzene and petroleum ether and from ethanol and melts at 165–166°; yield: 1.82 g. From the mother liquors an additional 0.53 g. of the desired product can be isolated.

The hydrochloride of 4 - [4 - (2-imidazolin-2-yl-methoxy) - phenyl]-3-phenyl-1,2-dihydro-naphthalene is obtained by treating the free compound with hydrochloric acid and evaporating any solvent, if necessary, by freeze-drying. The picrate is formed by substituting picric acid for the hydrochloric acid.

Upon treatment of an ethanol solution of 4-[4-(2-imidazolin - 2 - yl - methoxy) - phenyl]-3-phenyl-1,2-dihydro-naphthalene with methyl iodide, the 4-{4-[(4-methyl - 2 - imidazolin - 2 - yl) - methoxy]-phenyl}-3-phenyl-1,2-dihydro-naphthalene hydriodide.

The starting material used in the above procedure is prepared as follows: To a mixture of 2.4 g. of magnesium turnings in 50 ml. of diethyl ether are added a few drops of methyl iodide to initiate the formation of the Grignard reagent and then a solution of 19.0 g. of 4-bromo-anisole in 50 ml. of diethyl ether. The Grignard mixture is refluxed for two hours and is then cooled and treated with a solution of 6.7 g. of 2-phenyl-1-oxo-1,2,3,4-tetrahydro-naphthalene in 50 ml. of diethyl ether, which is added dropwise and while cooling with ice. After the addition is completed, refluxing is continued for another three hours, and the reaction mixture is allowed to stand for 15 hours and is then cooled with ice. The Grignard complex of 1-hydroxy-1-(4-methoxy-phenyl) - 2 - phenyl - 1,2,3,4-tetrahydro-naphahtlene is broken by adding 25 ml. of a saturated aqueous solution of ammonium chloride; under these conditions, the resulting 1 - hydroxy - 1 - (4 - methoxy-phenyl)-2-phenyl-1,2,3,4-tetrahydro-naphthalene is dehydrated to give the desired 4 - (4 - methoxy - phenyl)-3-phenyl-1,2-dihydro-naphthalene, which is isolated as follows: The reaction mixture is poured into 200 ml. of water, the organic solution is separated, and the aqueous layer is extracted twice with diethyl ether. The combined organic extracts are washed with water, dried over sodium sulfate and evaporated to yield the 4-(4-methoxy-phenyl)-3-phenyl-1,2-dihydro-naphthalene, which melts at 129–130° after recrystallization from a mixture of benzene and n-pentane.

A mixture of 40 g. of pyridine and 50 ml. of concentrated hydrochloric acid is slowly heated to 220° while distilling off the water; while maintaining that temperature, 5.0 g. of 1-(4-methoxy-phenyl)-2-phenyl-3,4-dihydro-naphthalene is added, and the reaction mixture is refluxed for thirty minutes. After cooling to room temperature, it is poured into 200 ml. of cold water, the desired 1 - (4 - hydroxy - phenyl)-2-phenyl-3,4-dihydro-naphthalene precipitates and melts at 124–125° after recrystallization from a mixture of benzene and n-pentane.

The following compounds are prepared according to the above procedure by selecting the appropriate starting materials:

| Benzocycloalkadiene Starting Material | Esterified R-methanol | Product |
| --- | --- | --- |
| 4-(4-hydroxy-phenyl)-3-phenyl-1,2-dihydro-naphthalene. | 2-chloromethyl-1,4,5,6-tetrahydro-pyrimidine hydrochloride. | 3-phenyl-4-[4-(1,4,5,6-tetrahydro-pyrimidin-2-yl-methoxy)-phenyl]-1,2-dihydro-naphthalene. |
| Do | 2-chloromethyl-4-methyl-2-imidazoline hydrochloride. | 4-{4-[(4-methyl-2-imidazolin-2-yl)-methoxy]-phenyl}-3-phenyl-1,2-dihydro-naphthalene. |
| 4-(4-hydroxy-phenyl)-3-(4-methyl-phenyl)-1,2-dihydro-naphthalene. | 2-chloromethyl-2-imidazoline hydrochloride | 4-[4-(2-imidazolin-2-yl-methoxy)-phenyl]-3-(4-methyl-phenyl)-1,2-dihydro-naphthalene. |
| 3-(4-chloro-phenyl)-4-(4-hydroxy-phenyl)-1,2-dihydro-naphthalene. | do | 3-(4-chloro-phenyl)-4-[4-(2-imidazolin-2-yl-methoxy)-phenyl]-1,2-dihydro-naphthalene. |
| 3,4-bis-(4-hydroxy-phenyl)-1,2-dihydro-naphthalene. | do | 3,4-bis-[4-(2-imidazolin-2-yl-methoxy)-phenyl]-1,2-naphthalene. |
| 3-(4-hydroxy-phenyl)-4-(4-methoxy-phenyl)-1,2-dihydro-naphthalene. | do | 3-[4-(2-imidazolin-2-yl-methoxy)-phenyl]-4-(4-methoxy-phenyl)-1,2-dihydro-naphthalene. |
| 4-(4-hydroxy-phenyl)-7-methyl-3-phenyl-1,2-dihydro-naphthalene. | do | 4-[4-(2-imidazolin-2-yl-methoxy)-phenyl]-7-methyl-3-phenyl-1,2-dihydro-naphthalene. |
| 6-chloro-4-(4-hydroxy-phenyl)-3-phenyl-1,2-dihydro-naphthalene. | do | 6-chloro-4-[4-(2-imidazolin-2-yl-methoxy)-phenyl]-3-phenyl-1,2-dihydro-naphthalene. |
| 4-(4-hydroxy-phenyl)-7-methoxy-3-phenyl-1,2-dihydro-naphthalene. | do | 4-[4-(2-imidazolin-2-yl-methoxy)-phenyl]-7-methoxy-3-phenyl-1,2-dihydro-naphthalene. |
| 3-(4-hydroxy-phenyl)-1-methyl-4-phenyl-1,2-dihydro-naphthalene. | do | 3-[4-(2-imidazolin-2-yl-methoxy)-phenyl]-1-methyl-4-phenyl-1,2-dihydro-naphthalene. |
| 4-(4-hydroxy-phenyl)-3-phenyl-7-trifluoro-methyl-1,2-dihydro-naphthalene. | do | 4-[4-(2-imidazolin-2-yl-methoxy)-phenyl]-3-phenyl-7-trifluoro-methyl-1,2-dihydro-naphthalene. |
| 3-(4-hydroxy-phenyl)-2-phenyl-indene | do | 3-[4-(2-imidazolin-2-yl-methoxy)-phenyl]-2-phenyl-indene. |
| 5-fluoro-3-(4-hydroxy-phenyl)-2-phenyl-indene | do | 5-fluoro-3-[4-(2-imidazolin-2-yl-methoxy)-phenyl]-2-phenyl-indene. |
| 3-(4-hydroxy-phenyl)-2-phenyl-indene | 2-chloromethyl-1,3-diaza-2-cycloheptene hydrochloride. | 3-{4-[(1,3-diaza-2-cycloalken-2-yl)-methoxy]-phenyl}-2-phenyl-indene. |

Usually the above benzocycloalkadiene starting material is mixed with the esterified R-methanol, preferably used in the form of its acid addition salt, in the presence of a suitable solvent or solvent mixture, and the salt-forming reagent, e.g., sodium hydride and the like, is then added; the amounts of starting material, esterified R-methanol compound and salt-forming reagent used are generally in line with those of the illustrated procedure. The latter may also be reacted first with the benzocycloalkadiene starting material and the esterified R-methanol compound may then be added.

*Example 2*

Pharmaceutical compositions containing one of the above benzocycloalkadiene compounds, in which the cycloalkadiene portion has from five to six ring members and its two carbon-to-carbon double bonds are conjugated, and in which each of the two carbon atoms of the non-benzenoid carbon-to-carbon double bond is substituted by monocyclic carbocyclic aryl, at least one of which has an R-methoxy substituent, in which R is a 2-(1,3-diaza-2-cycloalkenyl) radical having from five to seven ring members, or a pharmaceutically acceptable acid addition salt thereof as the pharmacologically active ingredient, are prepared according to standard procedures. They contain a pharmacologically effective amount of the active compound together with a pharmaceutically acceptable carrier; usually, the carrier represents the major portion of a pharmaceutical preparation, which consists essentially of from about 1 per cent to at most 50 percent of the active ingredient.

Pharmaceutical compositions for oral use have from about 0.01 g. to about 0.1 g. of one of the above benzocycloalkadiene compounds, or a pharmaceutically acceptable acid addition salt thereof as the pharmacologically active ingredient per single dosage unit, together with a pharmaceutically acceptable solid carrier.

Tablets, each containing 0.025 g. of 4-[4-(2-imidazolin-2-yl-methoxy)-phenyl]-3-phenyl-1,2-dihydro-naphthalene, are prepared as follows (for 25,000 tablets):

Ingredients:                                                G.
  4-[4-(2-imidazolin-2-yl-methoxy)-phenyl]-3-phenyl-1,2-dihydro-naphthalene _____ 625.00
  Lactose S.D. _____ 5,967.25
  Corn starch _____ 192.50
  Corn starch (for paste) _____ 143.00
  Confectioners sugar _____ 500.00
  Stearic acid _____ 72.25
  Purified water _____ Q.s.
  Alcohol anhydrous 3A _____ Q.s.

The 4-[4-(2-imidazolin-2-yl-methoxy)-phenyl]-3-phenyl-1,2-dihydro-naphthalene is mixed with an equal portion of lactose; the mixture is passed through a No. 16 screen on a Fitzmill at medium speed and placed into a mixer. The remainder of the lactose, the 192.5 g. of corn starch, the confectioners sugar and the stearic acid are added, and the powder is mixed for twenty minutes. 143.0 g. of corn starch is suspended in cold water and a paste is formed by diluting the mixture with 700 ml. of boiling water. The paste is then added to the dry powder mixture to form the granulate; granulation is completed by adding 50 ml. of a 1:1-mixture of the 3A alcohol and water. The wet mass is passed through a No. 5 screen on the Fitzmill at low speed, dried on trays at about 43° and then broken on a No. 12 screen. The granulate is compressed into tablets weighing 0.3 g., using $^{11}/_{32}$-inch dies and standard concave punches.

What is claimed is:

1. A member selected from the group consisting of the compound having the formula

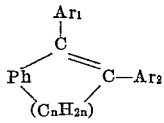

in which Ph stands for a member selected from the group consisting of 1,2-phenylene, (lower alkyl)-1,2-phenylene, (lower alkoxy)-1,2-phenylene, (halogeno)-1,2-phenylene and (halogeno-lower alkyl)-1,2-phenylene, one of $Ar_1$ and $Ar_2$ for a member selected from the group consisting of phenyl, (lower alkyl)-phenyl, (lower alkoxy)-phenyl, (halogeno)-phenyl and (halogeno-lower alkyl)-phenyl and the other for said Ar-radical containing in addition a 1,3-diaza-2-cycloalkenyl-(2)-methoxy radical having from five to seven ring members, and the group of the formula $—(C_nH_{2n})—$ is lower alkylene separating the group Ph from the carbon atom substituted by the group $Ar_2$ by one to two carbon atoms, and an acid addition salt thereof.

2. A compound of the formula

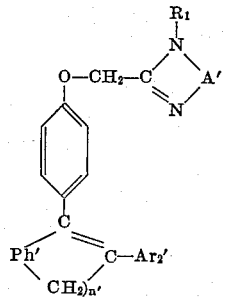

in which Ph' is a member selected from the group consisting of 1,2-phenylene, (lower alkyl)-1,2-phenylene, (lower alkoxy)-1,2-phenylene, (halogeno)-1,2-phenylene and (trifluoromethyl)-1,2-phenylene, the letter $n'$ is one of the integers 1 and 2, A' is alkylene having from two to three carbon atoms and separating the two nitrogen atoms by from two to three carbon atoms, $R_1$ is a member selected from the group consisting of hydrogen and lower alkyl, and the group $Ar_2'$ is a member selected from the group consisting of phenyl, (lower alkyl)-phenyl, (lower alkoxy)-phenyl, (halogeno)-phenyl, (trifluoromethyl)-phenyl and the group of the formula

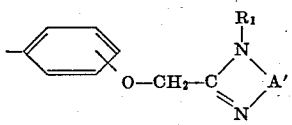

in which A' and $R_1$ have the previously-given meaning.

3. An acid addition salt of a compound of the formula

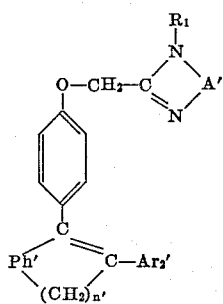

in which Ph' is a member selected from the group consisting of 1,2-phenylene, (lower alkyl)-1,2-phenylene, (lower alkoxy)-1,2-phenylene, (halogeno)-1,2-phenylene and (trifluoromethyl)-1,2-phenylene, the letter $n'$ is one of the integers 1 and 2, A' is alkylene having from two to three carbon atoms and separating the two nitrogen atoms by from two to three carbon atoms, $R_1$ is a member selected from the group consisting of hydrogen and lower alkyl, and the group $Ar_2'$ is a member selected from the group consisting of phenyl, (lower alkyl)-phenyl, (lower alkoxy)-phenyl, (halogeno)-phenyl, (trifluoromethyl)-phenyl and the group of the formula

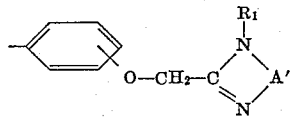

in which A' and $R_1$ have the previously given meaning.

4. 4 - [4 - (2 - imidazolin - 2 - yl-methoxy)-phenyl]-3-phenyl-1,2-dihydro-naphthalene.

5. An acid addition salt of 4-[4-(2-imidazolin-2-yl-methoxy)-phenyl]-3-phenyl-1,2-dihydro-naphthalene.

References Cited by the Examiner

UNITED STATES PATENTS

| | | | |
|---|---|---|---|
| 2,155,877 | 4/1939 | Waldmann et al. | 260—309.6 |
| 2,176,843 | 10/1939 | Kranzlein et al. | 260—309.6 |
| 2,516,108 | 7/1950 | Djerassi et al. | 260—309.6 |
| 2,680,745 | 6/1954 | Craig et al. | 260—309.6 |
| 2,808,360 | 10/1957 | Carrara | 167—65 |
| 2,867,602 | 1/1959 | Ham et al. | 260—45.5 |
| 2,867,625 | 1/1959 | Ham et al. | 260—309.6 |
| 3,011,946 | 12/1961 | Bartner et al. | 167—65 |

FOREIGN PATENTS 204,745    8/1939    Switzerland.

WALTER A. MODANCE, *Primary Examiner.*

NATALIE TROUSOF, *Assistant Examiner.*